United States Patent
Fries

(10) Patent No.: US 7,998,395 B2
(45) Date of Patent: Aug. 16, 2011

(54) METHOD FOR INJECTION MOLDING OF HOLLOW ARTICLES OF PLASTIC MATERIAL

(75) Inventor: Elmar Fries, Roettingen (DE)

(73) Assignee: ITW Automotive Products GmbH & Co. KG, Iserlohn (DE)

(*) Notice: Subject to any disclaimer, the term of this patent is extended or adjusted under 35 U.S.C. 154(b) by 0 days.

(21) Appl. No.: 12/513,580

(22) PCT Filed: Dec. 27, 2007

(86) PCT No.: PCT/IB2007/004123
§ 371 (c)(1), (2), (4) Date: May 5, 2009

(87) PCT Pub. No.: WO2008/087484
PCT Pub. Date: Jul. 24, 2008

(65) Prior Publication Data
US 2010/0072680 A1    Mar. 25, 2010

(30) Foreign Application Priority Data
Jan. 11, 2007  (DE) .......... 10 2007 001 756

(51) Int. Cl.
*B29C 45/00* (2006.01)
(52) U.S. Cl. ............ 264/513; 264/328.8; 264/328.19; 425/533
(58) Field of Classification Search .......... None
See application file for complete search history.

(56) References Cited

U.S. PATENT DOCUMENTS

| 4,752,198 A | * | 6/1988 | Boschman ............... 425/116 |
| 5,090,886 A | | 2/1992 | Jaroschek |

FOREIGN PATENT DOCUMENTS

| DE | 3913109 A1 | 10/1990 |
| DE | 19754006 A1 | 6/1999 |
| JP | 4320819 A | 11/1992 |
| JP | 5154862 A | 6/1993 |
| JP | 5200796 A | 8/1993 |
| JP | 6293040 A | 10/1994 |
| JP | 7100854 A | 4/1995 |
| JP | 9272138 A | 10/1997 |
| JP | 2000271967 A | 10/2000 |
| JP | 2005053210 A | 3/2005 |
| WO | 98/34771 A1 | 8/1998 |

OTHER PUBLICATIONS

ISR for PCT/IB2007/004123 dated May 15, 2008.

* cited by examiner

*Primary Examiner* — Monica A Huson
(74) *Attorney, Agent, or Firm* — Lowe Hauptman Ham & Berner LLP

(57) ABSTRACT

In an injection molding method to manufacture hollow plastic parts, at least one plastic part's hollow is shaped by evacuating an internal portion of the flowable material of an injection mold's cavity using a pressurized gas, and a gate of the mold and thereupon the molded article's aperture so made will be sealed off. After the flowable material has been moved from a blind duct into the gate and partly forced back into the hollow, the molded article will be ejected from the injection mold.

16 Claims, 1 Drawing Sheet

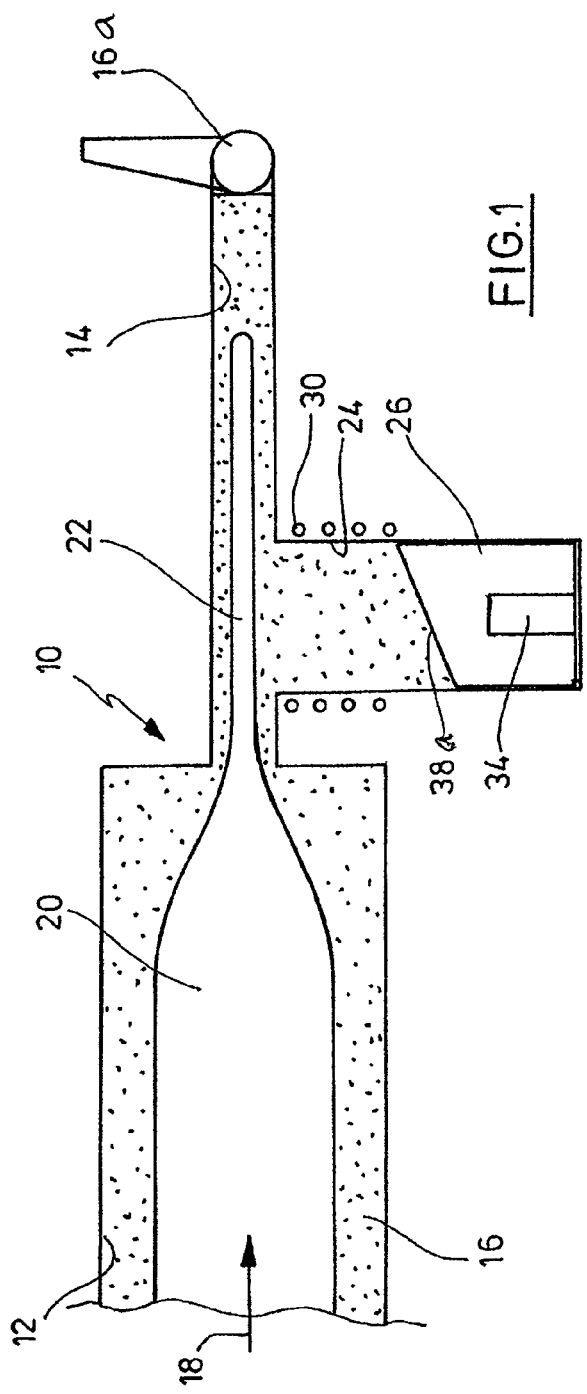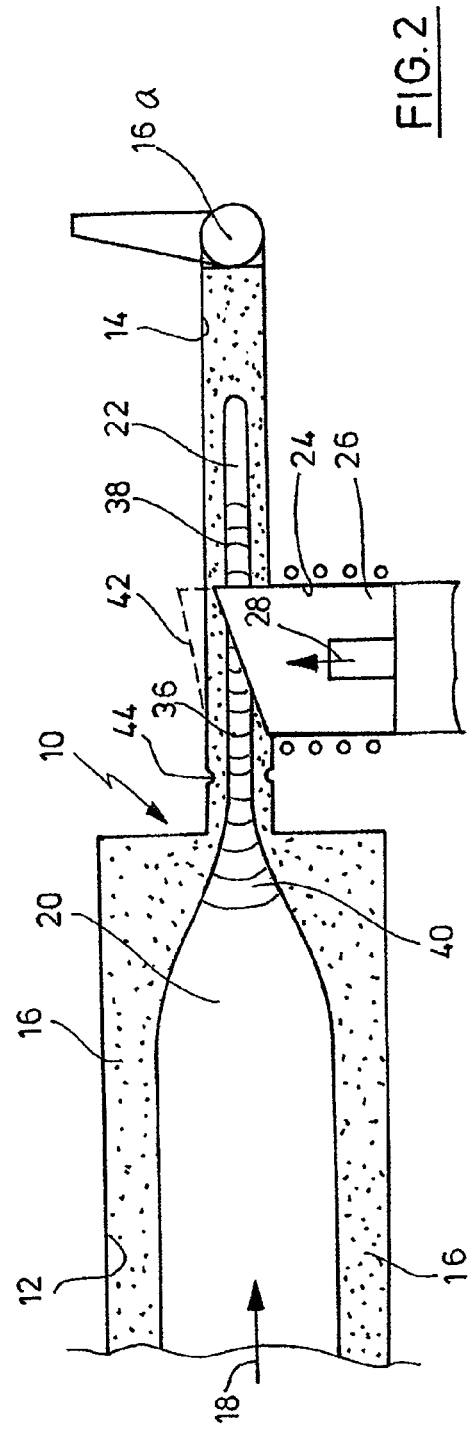

METHOD FOR INJECTION MOLDING OF HOLLOW ARTICLES OF PLASTIC MATERIAL

RELATED APPLICATIONS

The present application is based on International Application Number PCT/IB2007/004123 filed Dec. 27, 2007, and claims priority from German Application Number 10 2007 001 756.3 filed Jan. 11, 2007, the disclosures of which are hereby incorporated by reference herein in their entirety.

TECHNICAL FIELD

The present invention relates to an injection molding method for plastic, hollow molded articles.

Moreover the present invention also relates to an injection mold to make hollow molded articles.

BACKGROUND

The manufacture of molded plastic articles using injection molding is common state of the art. Moreover it is known to make hollow molded articles in a manner that following introduction of the flowable plastic into the injection mold cavity, pressurized gas shall be applied that shall evacuate a portion of the flowable plastic from the mold cavity through the runner duct.

After it has been removed from the injection mold, the molded articles comprises two apertures leading to the mold cavity, one aperture being constituted by the gas nozzle and the other by the hollow duct in the sprue which must be severed from the molded article. If such a molded article must be processed further, in particular in electroplating equipment, to fitted with metal coating(s), said apertures must be mandatorily sealed. Sealing the gas intake aperture raises no problems because a specific, geometric structure is involved and therefore an appropriate stopper may be used. On the other hand problems are encountered with the other aperture. The latter case inevitably entails further processing steps to seal the hollow molded articles against fluid leakage.

SUMMARY

The objective of the present invention is to create a method implementing full sealing of a hollow, injection molded article without entailing additional finishing or resort to a further injection molding implement.

In the method of the present invention, a specific quantity of flowable plastic is moved, by a power-driven plunger from a blind duct communicating with the runner duct into this runner duct. In this manner, the plastic in the blind duct moves into the runner duct in the sprue and partly back into the molded article's hollow. In this manner, the molded article's aperture is sealed off completely.

Accordingly, the method of the present invention allows sealing the molded article's cavity aperture in one step jointly with the making of the part in the injection mold.

It is known that the runner duct must be removed from the molded article. In one embodiment mode of the present invention, the molded article's runner duct is separated from it using the plunger.

In order that the material within the blind duct be sufficiently flowable, the plunger or the blind duct may be heated, for instance, by an appropriate electrical heater.

The injection molding equipment of the present invention to manufacture a hollow molded article comprises a blind duct which is connected to the runner duct comparatively close to the mold cavity. The bottom of the blind duct is constituted by the plunger which—as already mentioned—is driven by a power element. Illustratively this power element is a pneumatic or hydraulic cylinder. When manufacturing the injection molded article of the invention, the runner duct and the blind duct are filled up with a flowable material. A pressurized gas is introduced and an internal region of the flowable material within the mold cavity is removed through the runner duct, as a result of which a hollow duct of more or less pronounced length is constituted in that runner duct and extends through the blind duct and beyond. When the plunger is used to force the material out of the blind duct into the runner duct, part of said material migrates toward the mold cavity, sealing said cavity's aperture at the junction with the runner duct. The said aperture is completely sealed off in this manner, and as a result, even after ejecting the molded article and severing the runner duct, the mold cavity shall be impermeably sealed.

In one embodiment mode of the present invention, the plunger surface facing the runner duct is oblique relative to the mold cavity. In this manner more material is forced toward the mold cavity than in the opposite direction in what remains of the runner duct.

In another embodiment mode of the present invention, the plunger may be a cutting or severing tool to separate the runner duct from the molded article. Appropriately recesses complementary to the plunger shape may be constituted in the runner duct wall on the side opposite the blind duct to receive the plunger when it forces material out of the blind duct and as applicable also separates the runner duct.

BRIEF DESCRIPTION OF THE DRAWINGS

The invention is elucidated below in relation to the appended drawings.

FIG. 1 schematically shows manufacturing a molded article in an injection mold, following evacuation of a middle zone using compressed gas, and FIG. 2 shows the configuration of FIG. 1 after a portion of the evacuated material has been forced back into the mold cavity.

DETAILED DESCRIPTION

FIGS. 1 and 2 show an injection mold 10. Said mold illustratively is constituted by two mold halves which are selectively joined to each other to define a mold cavity 12 or to be moved apart in order to eject a molded article. The mold cavity 12 communicates with a runner duct 14 leading to a sprue 16a. Illustratively this sprue 16a communicates with an extruder from which flowable plastic is injected through the sprue 16a into the mold cavity 12 In FIG. 2, the injected material is denoted by 16. In a gas internal pressure procedure, pressurized gas is introduced through a so-called (omitted) gas needle into the mold cavity 12 as indicated by the arrow 18. In this manner, partly set material 16 is evacuated from the mold cavity 12 and forced back into the duct 14. In this manner, a hollow 20 of the molded part is constituted which extends into the duct 14 by means of a hollow channel 22.

Near the mold cavity 12, the duct 14 communicates with a transverse duct. It is sealed off by a plunger 26 to define a blind duct 24. The plunger 26 is driven by a power element and, as indicated in FIG. 2, it can be adjusted toward the duct 14 as indicated by the arrow 28.

The blind duct 24 may be heated by an electric heater 30. Moreover, the plunger 26 may be fitted with a heater element 34 to raise the temperature of the plunger 26.

The blind duct 24 is filled with flowable material 16 during injection molding. When the plunger 26 is operated as indicated in FIG. 2, the flowable material is forced out of the blind duct 24 and toward the duct 14 and, as a result, it is displaced along both sides of this duct 14 as illustrated at 36 and 38, respectively. The plunger 26 is fitted with an end face 38a, oblique to the mold cavity 12, so that, when said plunger is actuated, more flowable material 16 is displaced toward the mold cavity 12 than in the opposite direction. In this manner a lug or stopper 40 is formed in the molded article's aperture—that was formed by the introduction of gas—which completely seals said cavity off duct 14.

The duct 14 too can be separated from the molded article using the plunger 26. Appropriately the duct 14 may be fitted with a recess 42 (shown in dashed lines) which is complementary to the plunger 26 and situated in the wall opposite the blind duct 24.

Alternatively the duct 14 may be terminated conventionally, in which case a rupturing site 44 would be shaped into it.

The invention claimed is:

1. A method of injection molding an article having an internal hollow space, said method comprising:
    injecting flowable plastic material from a runner duct into a mold cavity of an injection mold;
    injecting pressurized gas into the mold cavity to move an internal portion of the flowable plastic material from the mold cavity into the runner duct and to form the hollow space of the article in the mold cavity, wherein said hollow space extends into the runner duct and defines in the runner duct a hollow channel;
    operating a plunger to project into the runner duct across the hollow channel to partially force the flowable plastic material from the runner duct back into the mold cavity to seal off the hollow space inside the mold cavity.

2. A method of claim 1, further comprising
    heating the plunger to keep the plastic material in said blind channel in flowable form.

3. A method of claim 1, further comprising:
    after said operating, curing the plastic material to form the article with the hollow space in the mold cavity and to form a lug in the runner duct between the plunger and the mold cavity,
    wherein said lug is formed with a weakened breaking point defined by a projection on an inner wall of the runner duct.

4. A method of claim 1, wherein
    said plunger defines a bottom of a blind channel connected to the runner duct; and
    said method further comprises heating at least one of the plunger or the blind channel to keep the plastic material in said blind channel in flowable form.

5. A method of claim 1, wherein
    said plunger has an end facing the runner duct and inclined relative to the runner duct; and
    in said operating, said end of the plunger moves more flowable plastic material toward the mold cavity than away from the mold cavity.

6. A method of claim 5, wherein
    before said plunger is operated to project into the runner duct, said end extends obliquely toward the runner duct and away from the mold cavity.

7. A method of claim 5, wherein
    said plunger defines a bottom of a blind channel connected to the runner duct;
    an inner wall of the runner duct opposite to the blind channel has a recess complementary in shape to said end of the plunger; and
    said operating is performed to project the plunger across the runner duct until said end of the plunger is received in the recess and completely separates the plastic material in the mold cavity and in the runner duct up to the plunger from the plastic material in the runner duct on an opposite side of the plunger.

8. An injection mould for the manufacture of an article having at least one hollow space, comprising
    a preferably split injection tool having at least one cavity, the cavity being connected to a casting channel through which plasticized mass is pressed into the mould cavity, and
    a gas passage through which gas under pressure is supplied into the mould cavity to remove an inner portion of the plasticized mass from the mould cavity through the casting channel,
    wherein
    adjacent to the mould cavity, a blind channel is formed connected to the casting channel, the bottom of the blind channel being formed by a plunger within the blind channel and the plunger being actuable by power means to move the plunger towards the casting channel;
    a surface of the plunger facing the casting channel is inclined relative to the casting channel;
    the plunger is formed as a cutting or separating tool; and
    the wall of the casting channel opposite to the blind channel has a recess complementary to the shape of the plunger for receiving the associated plunger's portion upon its movement into the casting channel.

9. The injection mould of claim 8, wherein the plunger includes an electrical heater.

10. The injection mould of claim 8, wherein the blind channel includes an electrical heater.

11. An injection mould for manufacturing an article having a hollow space, said mould comprising
    a split injection tool having a mold cavity,
    a runner duct connected to the mold cavity for injection of flowable plastic material into the mold cavity,
    a gas passage connected to the mold cavity for supplying pressurized gas into the mold cavity to remove an inner portion of the flowable plastic material from the mold cavity through the runner duct to form the hollow space of the article in the mold cavity;
    a blind channel connected to the runner duct at a position adjacent to the mold cavity; and
    a plunger defining a bottom of the blind channel and moveable from within the blind channel into the runner duct for partially forcing the flowable plastic material from the runner duct back into the mold cavity to seal off the hollow space inside the mold cavity;
    wherein
    said plunger has an end facing the runner duct and inclined relative to the runner duct; and
    when said plunger does not project into the runner duct, said end extends obliquely toward the runner duct and away from the mold cavity so that, when said plunger projects into the runner duct in operation, said end of the plunger moves more flowable plastic material toward the mold cavity than away from the mold cavity.

12. An injection mould of claim 11, further comprising
    at least one heater for keeping the plastic material in said blind channel in flowable form.

13. An injection mould of claim 12, wherein
    said at least one heater comprises an electric heater.

14. An injection mould of claim 12, wherein said at least one heater is provided with at least one of the plunger or the blind channel.

15. An injection mould of claim 11, wherein the runner duct includes, on an inner wall thereof, a projection between the mold cavity and the position where the blind channel is connected with the runner duct; and said projection is arranged for defining a weakened breaking point in a lug formed upon curing of the plastic material in the runner duct between the plunger and the mold cavity.

16. An injection mould of claim 11, wherein an inner wall of the runner duct opposite to the blind channel has a recess complementary in shape to said end of the plunger for receiving said end of the plunger when the plunger projects into and across the runner duct to completely separate the plastic material in the mold cavity and in the runner duct up to the plunger from the plastic material in the runner duct on an opposite side of the plunger.

* * * * *